(12) United States Patent
Andersen

(10) Patent No.: US 7,178,880 B2
(45) Date of Patent: Feb. 20, 2007

(54) WHEEL CENTERING PIN, KIT AND METHOD

(76) Inventor: James H. Andersen, 1519 Ticonderoga Dr., Fort Collins, CO (US) 80525

(*) Notice: Subject to any disclaimer, the term of this patent is extended or adjusted under 35 U.S.C. 154(b) by 54 days.

(21) Appl. No.: 10/868,687

(22) Filed: Jun. 15, 2004

(65) Prior Publication Data

US 2005/0275278 A1    Dec. 15, 2005

(51) Int. Cl.
*B60B 25/00* (2006.01)
*B25B 27/14* (2006.01)

(52) U.S. Cl. .................... 301/35.627; 301/35.632; 29/273

(58) Field of Classification Search .......... 301/35.627, 301/35.629; 29/271, 273; 254/DIG. 5
See application file for complete search history.

(56) References Cited

U.S. PATENT DOCUMENTS

| | | | | | |
|---|---|---|---|---|---|
| 1,384,405 | A | * | 7/1921 | Putnam | 301/35.621 |
| 2,051,953 | A | * | 8/1936 | Leathers | 411/435 |
| 4,768,279 | A | * | 9/1988 | Lafferty | 29/525.11 |
| 5,022,133 | A | * | 6/1991 | Weitekamp | 29/273 |
| 5,716,105 | A | * | 2/1998 | Seifert | 301/35.627 |
| 5,897,171 | A | * | 4/1999 | Seifert | 301/35.627 |

* cited by examiner

*Primary Examiner*—Jason R. Bellinger
(74) *Attorney, Agent, or Firm*—Ancel W. Lewis, Jr.

(57) ABSTRACT

A wheel centering pin disclosed for vehicle wheels having apertures of uniform diameter. The wheel centering pin is provided as a set of three that are threaded on three circumferentially spaced hub bolts on which a wheel is mounted to center the wheel. Nuts are threaded on the remaining bolts and tightened to fasten the wheel to the hub. The centering pins are removed, and remaining nuts are applied in their place and tightened on the remaining bolts to center the wheel.

14 Claims, 2 Drawing Sheets

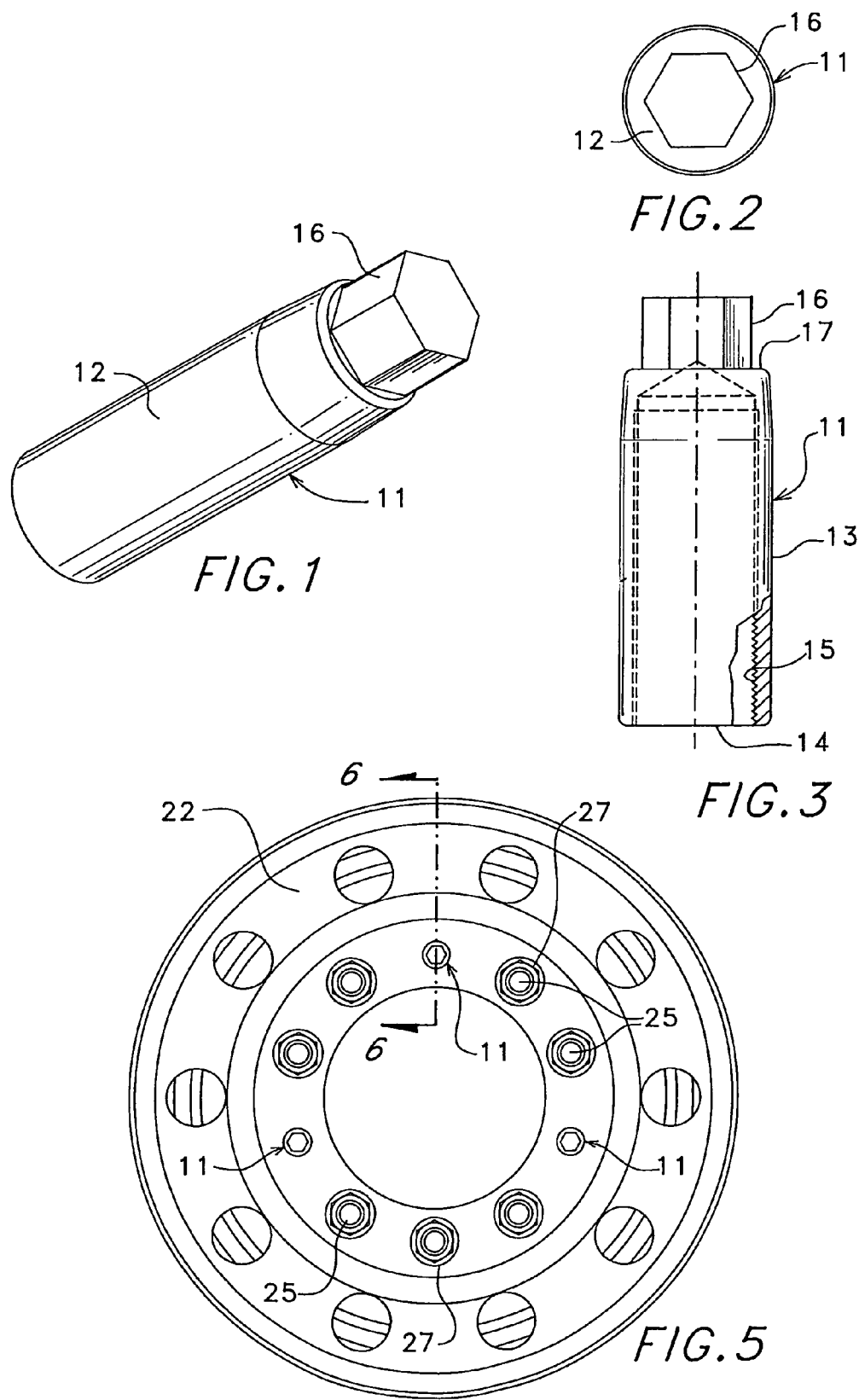

shaft portion on a hub bolt described hereinafter. The tool engageable portion 16 shown is a multi-sided head portion of hexagonal shape to be engaged by a conventional wrench. Other tool engageable portions such as a screw driver slot could be used. The pin 11 preferably is made as a one piece construction with the main body portion 12 and tool engageable portion 16 formed together from metal such as mild steel that is heat treated for wear. The centering pins 11 are preferably provided as a set of three as shown in FIG. 4.

WHEEL CENTERING PIN, KIT AND METHOD

TECHNICAL FIELD

The present invention relates to mounting vehicle wheels on hubs and more particularly to a device, kit and method for centering a vehicle wheel, particularly a truck wheel, on a hub.

BACKGROUND ART

In the past vehicle wheels have typically incorporated a taper or bevel on each wheel aperture and a complementary taper on the wheel nut to center the wheel on the hub when the wheel is mounted. Presently there are truck wheels such as the 22.5 and 24.5 UNI-Mount truck wheels that have wheel apertures of uniform diameter and use flanged nuts with no taper. This construction does not ensure the wheel is centered on the hub during mounting. If the wheel is not centered on the hub, the wheel is usually unbalanced and results in unnecessary tire wear.

SUMMARY OF THE INVENTION

A wheel centering pin disclosed is used as a set of three that are threaded on three hub bolts to center the wheel on the hub during wheel mounting. The wheel centering pin has a hollow main body portion, preferably cylindrical with an exterior surface of uniform diameter sized to slide into and substantially fill one of the wheel apertures when the wheel is mounted on the hub. The hollow main body portion has internal threads with an open first end to thread on a hub bolt. A tool engaging portion shown as a multi-sided head portion at a second end of the shaft portion opposite the first end is engaged by a wrench for rotating the main body portion to thread and un-thread the main body portion on the hub bolt. In use, with the wheel on the hub, three centering pins are threaded on three bolts, preferably at three selected degree intervals shown at 108, 144, and 108 degree intervals proceeding clockwise from the zero or twelve o'clock position. The wheel nuts are threaded on the remaining bolts and tightened. The centering pins are removed and replaced by wheel nuts that are also tightened.

DETAILED DESCRIPTION OF THE DRAWINGS

FIG. 1 is a perspective view of a wheel centering pin embodying features of the present invention.

FIG. 2 is a top view of FIG. 1

FIG. 3 is a side elevation view of FIG. 1 partially broken away to show internal threads.

FIG. 5 is a front elevation view of a wheel mounted on a hub with three centering pins of FIG. 1, centering the wheel on the hub and wheel nuts on the remaining bolts.

Figure 4:
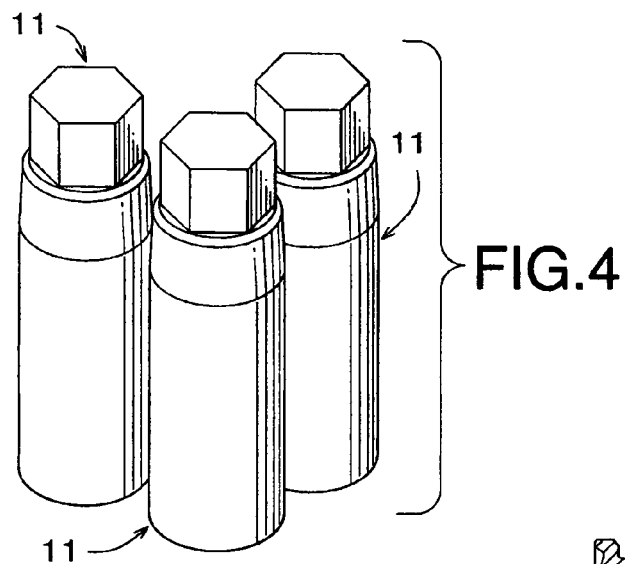
FIG. 4 is a perspective view showing a set of three of the centering pins shown in FIG. 1.
Figure 6:
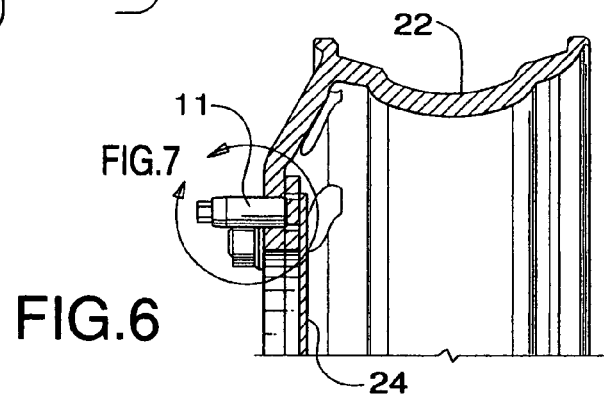
FIG. 6 is a sectional view taken along line 6—6 of FIG. 5.
Figure 7:
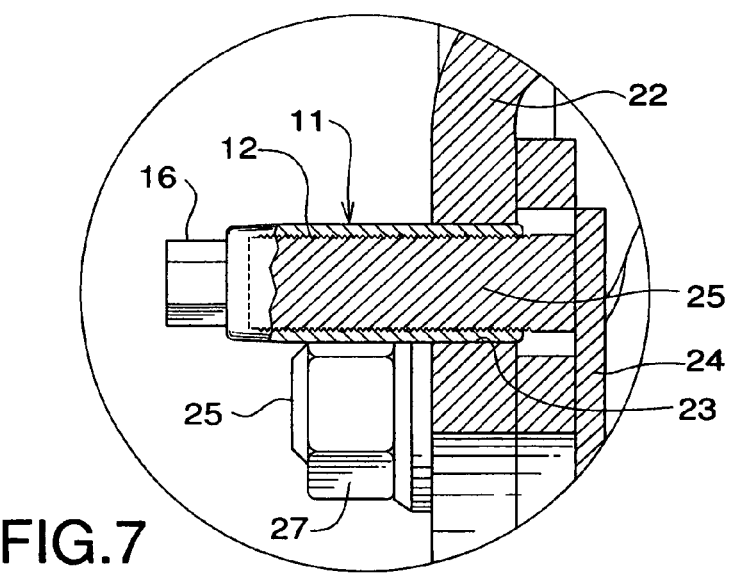
FIG. 7 is an enlarged view of a portion of FIG. 6.

Referring now to FIGS. 1–3, there is shown a wheel centering pin 11 embodying features of the present invention. Each wheel centering pin 11 has a hollow main body portion 12 of cylindrical shape, having a cylindrical, smooth exterior surface 13 of uniform diameter that is sized to slide into and substantially fill one of the wheel apertures described hereinafter. The main body portion 12 terminates in an open first end 14 and has internal threads 15. A tool engageable portion 16 at a closed second end 17 opposite the first end 14 is engaged by a tool or wrench for rotating the portion 16 and shaft portion 12 to thread and un-thread the Referring now to FIGS. 4–7, there is shown a truck wheel 22 of the UNI-Mount type without the tire having ten circumferentially spaced apertures 23 at thirty-six degree intervals. The wheel 22 is shown mounted on a hub 24 having ten circumferentially spaced, studs or bolts 25 each of which extends through an associated wheel aperture 23 when the wheel 22 is mounted on the hub 24. Seven flanged wheel nuts 27 are shown threaded on seven of the bolts 25. Three identical wheel centering pins 11 are shown threaded on three bolts 25 at three selected degree intervals shown at 0, 108 and 242 degrees in a clockwise direction with respect to the twelve o'clock position. Each hollow main body portion of each pin has a radial dimension sufficient to substantially fill a space between the outside of the associated bolt and the inside of an associated wheel aperture.

The bolts 25 have external threads. The main body portion has internal threads 15 that are complimentary to and mate with the external threads of the bolts 25.

In use, in carrying out the method of the present invention, the vehicle is elevated and the wheel nuts are removed from the hub 14. Three centering pins 11 are threaded on three hub bolts at three selected degree intervals of 0, 108 and 242 degrees in a clockwise direction with respect to the twelve o'clock position as above described. The wheel is mounted on the hub. Seven wheel nuts 27 are installed on the remaining hub bolts and tightened lightly. The centering pins 11 are removed by un-threading. Three wheel nuts 27 are threaded on the three remaining bolts. Finally, all wheel nuts 27 are firmly tightened.

From the foregoing it is apparent the wheel centering pins are easily installed and removed. The device has been found effective in providing balanced wheels and thereby minimize wheel vibration and tire wear.

Although the present invention has been described with a certain degree of particularity, it is understood that the present disclosure has been made by way of example and that changes in details of structure may be made without departing from the spirit thereof.

What is claimed is:

1. A wheel centering pin assembly comprising:
   three wheel centering pins at selected circumferentially spaced positions on a hub, having a plurality of circumferentially spaced bolts, having external threads, each said pin including,
   a hollow main body portion having an exterior surface of uniform diameter and sized to slide into one of a plurality of apertures on a wheel when said wheel is mounted on said hubs said main body portion having a radial dimension sufficient to substantially fill a space between the outside of an associated bolt and the inside of an associate wheel aperture, said main body portion terminating in an open first end, said main body portion having internal threads that are complementary to and mate with said external threads to enable said main body portion to be threaded on one of said bolts and,
   a tool engageable portion at a second end of said main body portion opposite said first end that is engaged by a tool for rotating said tool engageable portion to thread and un-thread said main body portion,
   whereby upon the installation of said three pins on selected of three of said circumferentially spaced bolts said wheel is centered on said hub and a nut is tightened on each remaining of said bolts to fasten said wheel to said hub after which said pins are removed.

2. The pin assembly as set forth in claim 1 wherein said main body portion is of cylindrical shape.

3. The pin assembly as set forth in claim 1 wherein said tool engageable portion is a multi-sided head.

4. The pin assembly as set forth in claim 3 wherein said head is hexagonal in shape.

5. The pin assembly as set forth in claim 1 wherein said exterior surface of said main body portion is cylindrical.

6. The pin assembly as set forth in claim 1 wherein said exterior surface substantially fills said wheel aperture and is slidable therein.

7. The pin assembly as set forth in claim 1 wherein said set of three centering pins are installed on bolts disposed at degree intervals of 0, 108 and 242 degrees on said hub in a clockwise direction with respect to a twelve o'clock position.

8. The pin assembly as set forth in claim 1 wherein said three pins are at twelve, four and eight o'clock positions.

9. The pin assembly as set forth in claim 1 wherein said main body portion and tool engageable portion are of a one piece metal construction.

10. A wheel centering pin assembly comprising:
three wheel centering pins at selected circumferentially spaced positions on a hub, having a plurality of circumferentially spaced bolts, having external threads, each said pin including,
a hollow main body portion having an exterior surface of uniform diameter and sized to slide into one of a plurality of circumferentially spaced apertures on a wheel when said wheel is mounted on said hub, said main body portion having a radial dimension sufficient to substantially fill a space between the outside of an associated bolt and the inside of an associated wheel aperture, said main body portion terminating in an open first end, said exterior surface of said main body portion is cylindrical, said main body portion having internal threads that are complementary to and mate with said external threads to enable said main body portion to be threaded on one of said bolts and,
a tool engageable portion at a second end of said main body portion opposite said first end that is engaged by a tool for rotating said head portion to thread and un-thread said main body portion, the said tool engageable portion is a hexagonal head,
whereby upon the installation of said three centering pins on selected of three of said circumferentially spaced bolts said wheel is centered on said hub and a nut is tightened on each remaining of said bolts to fasten said wheel to said hub after which said centering pins are removed.

11. A wheel centering pin assembly for use as a set of three that are temporarily installed on selected circumferentially spaced bolts on a hub for a wheel having a plurality of circumferentially spaced apertures of uniform diameter, the pin assembly comprising:
three wheel centering pins at selected circumferentially spaced positions on a hub, having a plurality of circumferentially spaced bolts, having external threads, each said pin including,
a hollow, cylindrical shape and main body portion having an exterior surface of uniform diameter sized to slide into one of said wheel apertures when said wheel is mounted on said hub, said main body portion having a radial dimension sufficient to substantially fill a space between the outside of an associated bolt and the inside of an associated wheel aperture, said main body portion having a socket terminating in an open first end having,
an internally threaded portion having internal threads that are complementary to and mate with said external threads to be threaded on one of said threaded bolts to enable said main body portion and,
a wrench engaging head portion of hexagonal shape at a closed second end of said hub portion opposite said first end that is engaged by a wrench of a selected size to rotate said head portion to thread and un-thread said main body portion on said one threaded bolt,
whereby upon the installation of said set of three of said pins on selected of three of said circumferentially spaced bolts said wheel is centered on said hub and a nut may be tightened on each of remaining of said bolts to fasten said wheel to said hub after which said alignment pins are removed from associated of said bolts.

12. A wheel centering kit comprising:
a set of three identical centering pins that are temporarily installed on selected of a plurality of circumferentially spaced threaded bolts having external threads on a hub for a wheel having a plurality of circumferentially spaced apertures of uniform diameter, each pin having,
a hollow main body portion having an exterior surface of uniform diameter and sized to slide into one of said wheel apertures, said main body portion having a radial dimension sufficient to substantially fill a space between the outside of an associated bolt and the inside of an associate wheel aperture to center the wheel on said hub, said main body portion terminating in an open first end having,
an internally threaded portion to enable said hub portion to be threaded on one of said bolts and,
a tool engageable portion at a second end opposite said first end that is engaged by a tool to rotate said tool engageable portion to thread and un-thread said main body portion on said one bolt,
whereby upon the installation of said pins on selected of three circumferentially spaced bolts said wheel is centered on said hub and a wheel nut is tightened on each remaining of said threaded bolts to fasten said wheel to said hub after which said set of three pins are removed from associated of said threaded bolts.

13. A method of centering a wheel having circumferentially spaced apertures of uniform diameter on a hub having circumferentially spaced bolts having external threads comprising the steps of:
threading three centering pins on three of said bolts at 0, 108 and 242 degrees on said hub in a clockwise direction with respect to a twelve o'clock position, each said pin including a hollow main body portion having an exterior surface of uniform diameter sized to slide into one of a plurality of apertures on a wheel when said wheel is mounted on said hub, said main body portion having internal threads that are complementary to and mate with said external threads to enable said main body portion to be threaded on one of said bolts.
mounting the wheel on the hub with said bolts in said apertures, said pins having a radial dimension sufficient to substantially fill a space between the outside of each bolt and the inside of each wheel aperture to center said wheel on said hub,
threading nuts on the remaining of said bolts,
removing the centering pins, and
threading nuts on the remaining three of said bolts.

14. The method as set forth in claim 13 wherein said three centering pins are mounted at degree intervals of 0, 108 and 242 degrees on said hub in a clockwise direction with respect to a twelve o'clock position.

* * * * *

UNITED STATES PATENT AND TRADEMARK OFFICE
CERTIFICATE OF CORRECTION

PATENT NO. : 7,178,880 B2 Page 1 of 1
APPLICATION NO. : 10/868687
DATED : February 20, 2007
INVENTOR(S) : James H. Andersen It is certified that error appears in the above-identified patent and that said Letters Patent is hereby corrected as shown below:

Column 1, Line 38, change "108, 144 and 108" to -- 0, 108 and 252 --

Column 2, Line 20, change "242" to -- 252 --

Column 2, Line 31, change "242" to -- 252 --

Column 3, Claim 7, Line 16, change "242" to -- 252 --

Column 4, Claim 13, Line 48, change "242" to -- 252 --

Column 4, Claim 14, Line 64, change "242" to -- 252 --

Signed and Sealed this

Twenty-fourth Day of April, 2007

JON W. DUDAS
*Director of the United States Patent and Trademark Office*

(12) INTER PARTES REEXAMINATION CERTIFICATE (985th)
United States Patent
Anderson

(10) Number: US 7,178,880 C1
(45) Certificate Issued: Nov. 3, 2014

(54) WHEEL CENTERING PIN, KIT AND METHOD

(76) Inventor: James H. Anderson, Fort Collins, CO (US)

Reexamination Request:
No. 95/001,677, Jul. 19, 2011

Reexamination Certificate for:
Patent No.: 7,178,880
Issued: Feb. 20, 2007
Appl. No.: 10/868,687
Filed: Jun. 15, 2004

Certificate of Correction issued Apr. 24, 2007

(51) Int. Cl.
*B60B 25/00* (2006.01)
*B25B 27/14* (2006.01)

(52) U.S. Cl.
USPC .................. 301/35.627; 301/35.632; 29/273

(58) Field of Classification Search
None
See application file for complete search history.

(56) References Cited

To view the complete listing of prior art documents cited during the proceeding for Reexamination Control Number 95/001,677, please refer to the USPTO's public Patent Application Information Retrieval (PAIR) system under the Display References tab.

*Primary Examiner* — Russell Stormer

(57) ABSTRACT

A wheel centering pin disclosed for vehicle wheels having apertures of uniform diameter. The wheel centering pin is provided as a set of three that are threaded on three circumferentially spaced hub bolts on which a wheel is mounted to center the wheel. Nuts are threaded on the remaining bolts and tightened to fasten the wheel to the hub. The centering pins are removed, and remaining nuts are applied in their place and tightened on the remaining bolts to center the wheel.

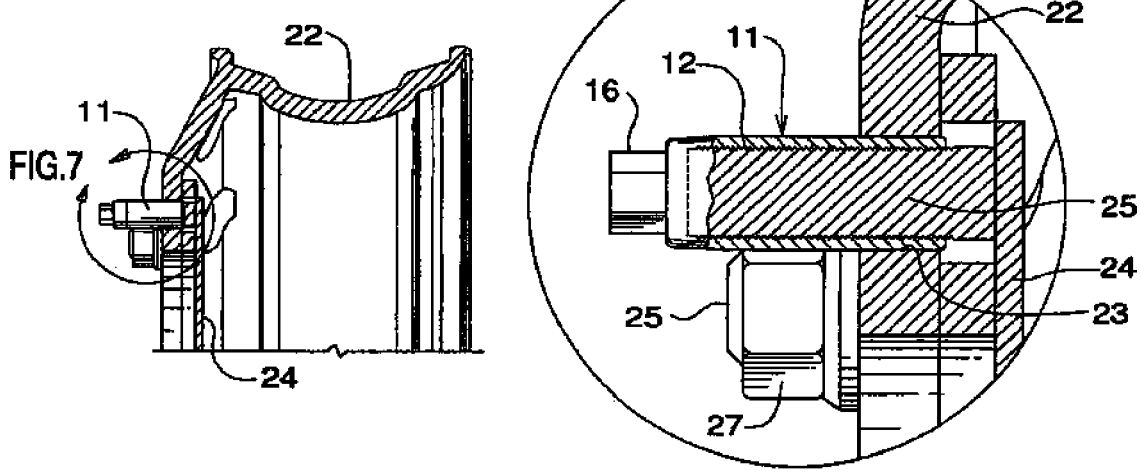

US 7,178,880 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 11 and 14 are cancelled.

Claims 1, 7, 10, 12 and 13 are determined to be patentable as amended.

Claims 2-6, 8 and 9, dependent on an amended claim, are determined to be patentable.

1. A wheel centering pin assembly, *for centering a wheel having a plurality of circumferentially spaced wheel apertures on a hub having a plurality of circumferentially spaced bolts with external threads,* comprising[.]:
    three wheel centering pins at selected [circumferentially spaced positions on a hub, having a plurality of circumferentially spaced bolts, having external threads] *bolts on said hub that center said wheel on said hub while a nut is tightened on each remaining of said bolts to fasten said wheel on said hub at a centered position on said hub*, each said pin including:
    a hollow main body portion having an exterior surface of uniform diameter and sized to slide into one of [a plurality of apertures on a wheel] *said wheel apertures* when said wheel is mounted on said [hubs] *hub*, said main body portion having a radial dimension sufficient to substantially fill a space between the outside of an associated bolt and the inside of an [associate] *associated* wheel aperture, said main body portion terminating in an open first end, said main body portion having internal threads that are complementary to and mate with said external threads to enable said main body portion to be threaded on one of said bolts, and[.]
    a tool engageable portion *terminating said pin* at a *closed* second end of said main body portion opposite said first end [that is], *said tool engageable portion being* engaged by a tool for rotating said tool engageable portion to thread and un-thread said main body portion,
    whereby [upon the installation of said three pins on selected of three of said circumferentially spaced bolts said wheel is centered on said hub and] *after* a nut is tightened on each remaining of said bolts [to fasten said wheel to said hub after which], said pins are removed.

7. The pin assembly as set forth in claim 1 wherein said [set of] three centering pins are installed on bolts disposed at degree intervals of 0, 108 and 252 degrees on said hub in a clockwise direction with respect to a twelve o'clock position.

10. A wheel centering pin assembly, *for centering a wheel having a plurality of circumferentially spaced wheel apertures on a hub having a plurality of circumferentially spaced bolts with external threads,* comprising:
    three wheel centering pins at selected [circumferentially spaced positions on a hub, having a plurality of circumferentially spaced bolts, having external threads] *bolts on said hub that center said wheel on said hub while a nut is tightened on each remaining of said bolts to fasten said wheel on said hub at a centered position on said hub*, each said pin including[.]:
    a hollow main body portion having an exterior surface of uniform diameter and sized to slide into one of [a plurality of circumferentially spaced apertures on a wheel] *said wheel apertures* when said wheel is mounted on said hub, said main body portion having a radial dimension sufficient to substantially fill a space between the outside of an associated bolt and the inside of an associated wheel aperture, said main body portion terminating in an open first end, said exterior surface of said main body portion is cylindrical, said main body portion having internal threads that are complementary to and mate with said external threads to enable said main body portion to be threaded on one of said bolts, and[.]
    a tool engageable portion *terminating said pin* at a second end of said main body portion opposite said first end [that is], *said tool engageable portion being* engaged by a tool for rotating said [head] *tool engageable* portion to thread and un-thread said main body portion, [the] *said* tool engageable portion [is] *being* a hexagonal head,
    whereby [upon the installation of said three pins on selected of three of said circumferentially spaced bolts said wheel is centered on said hub and] *after* a nut is tightened on each remaining of said bolts [to fasten said wheel to said hub after which], said pins are removed.

12. A wheel centering kit comprising:
    a set of three identical centering pins that are temporarily installed on selected of a plurality of circumferentially spaced threaded bolts [having] *with* external threads on a hub for a wheel having a plurality of circumferentially spaced *wheel* apertures of uniform diameter, *said pins centering said wheel on said hub while a nut is tightened on each remaining of said bolts to fasten said wheel on said hub at a centered position on said hub*, each pin having[.]:
    a hollow main body portion having an exterior surface of uniform diameter and sized to slide into one of said wheel apertures, said main body portion having a radial dimension sufficient to substantially fill a space between the outside of an associated bolt and the inside of an associate wheel aperture to center the wheel on said hub, said main body portion terminating in an open first end having[,] an internally threaded portion to enable said [hub] *main body* portion to be threaded on one of said bolts, and[.]
    a tool engageable portion *terminating said pin* at a second end opposite said first end that is engaged by a tool to rotate said tool engageable portion to thread and un-thread said main body portion on said one bolt,
    whereby [upon the installation of said pins on selected of three circumferentially spaced bolts said wheel is centered on said hub and] *after* a wheel nut is tightened on each remaining of said threaded bolts [to fasten said wheel to said hub after which] said set of three pins [are] *is* removed from associated of said threaded bolts.

13. A method of centering a wheel having circumferentially spaced *wheel* apertures of uniform diameter on a hub having circumferentially spaced bolts [having] *with* external threads comprising the steps of:
    threading three centering pins on three of said bolts at 0, 108 and 252 degrees on said hub in a clockwise direction with respect to a twelve o'clock position, each said pin including a hollow main body portion having an exterior surface of uniform diameter sized to slide into one of a plurality of apertures on a wheel when said wheel is mounted on said hub, said main body portion having internal threads that are complementary to and mate with said external threads to enable said main body portion to be threaded on one of said bolts[.], mounting the wheel on the hub with said bolts in said *wheel* apertures, said pins having a radial dimension sufficient to substantially fill a space between the outside of each bolt and the inside of each wheel aperture to center said wheel on said hub, threading nuts on the remaining of said bolts *while said pins center said wheel on said hub*, removing the centering pins, and threading nuts on the remaining three of said bolts.

\* \* \* \* \*